United States Patent [19]

Matthias et al.

[11] Patent Number: 4,830,402
[45] Date of Patent: May 16, 1989

[54] ROLL OVER BAR FOR MOTOR VEHICLES

[75] Inventors: Klaus Matthias, Sindelfingen; Arno Disson, Grafenau; Gerald Schick, Garching; Karl-Heinz Baumann, Bondorf; Albert Euteneuer, Gärtringen, all of Fed. Rep. of Germany

[73] Assignee: Daimler-Benz Aktiengesellschaft, Stuttgart, Fed. Rep. of Germany

[21] Appl. No.: 182,355

[22] Filed: Apr. 18, 1988

[30] Foreign Application Priority Data

Apr. 16, 1987 [DE] Fed. Rep. of Germany ....... 3712940

[51] Int. Cl.⁴ .................. B60R 27/00; B60R 21/02
[52] U.S. Cl. ................................................. 280/756
[58] Field of Search ............. 280/756, 760, 770; 296/100, 102

[56] References Cited

U.S. PATENT DOCUMENTS

| 3,622,177 | 11/1971 | Notestine | 280/756 |
| 3,647,258 | 3/1972 | Porsche et al. | 280/756 |
| 3,918,740 | 11/1975 | Notestine | 280/756 |
| 4,135,591 | 1/1979 | Eberle | 280/756 |
| 4,158,460 | 6/1979 | White | 280/756 |
| 4,171,141 | 10/1979 | Hobrecht | 280/756 |
| 4,350,367 | 9/1982 | Kolb et al. | 280/756 |
| 4,557,502 | 12/1985 | Scaduto et al. | 280/756 |
| 4,673,190 | 6/1987 | Ahlberg | 280/756 |

FOREIGN PATENT DOCUMENTS 1934828 1/1971 Fed. Rep. of Germany ...... 280/756

Primary Examiner—Richard A. Bertsch
Attorney, Agent, or Firm—Barnes & Thornburg

[57] ABSTRACT

To economize weight, an arcuate support tube of a roll-over yoke is produced from high-tensile heat-treated material and received by both members and by part of the adjacent median region in bracing structures which mount it on the motor car body and which consist respectively of two mutually connected half-shells which positively enclose and thereby retain the support tube.

12 Claims, 2 Drawing Sheets

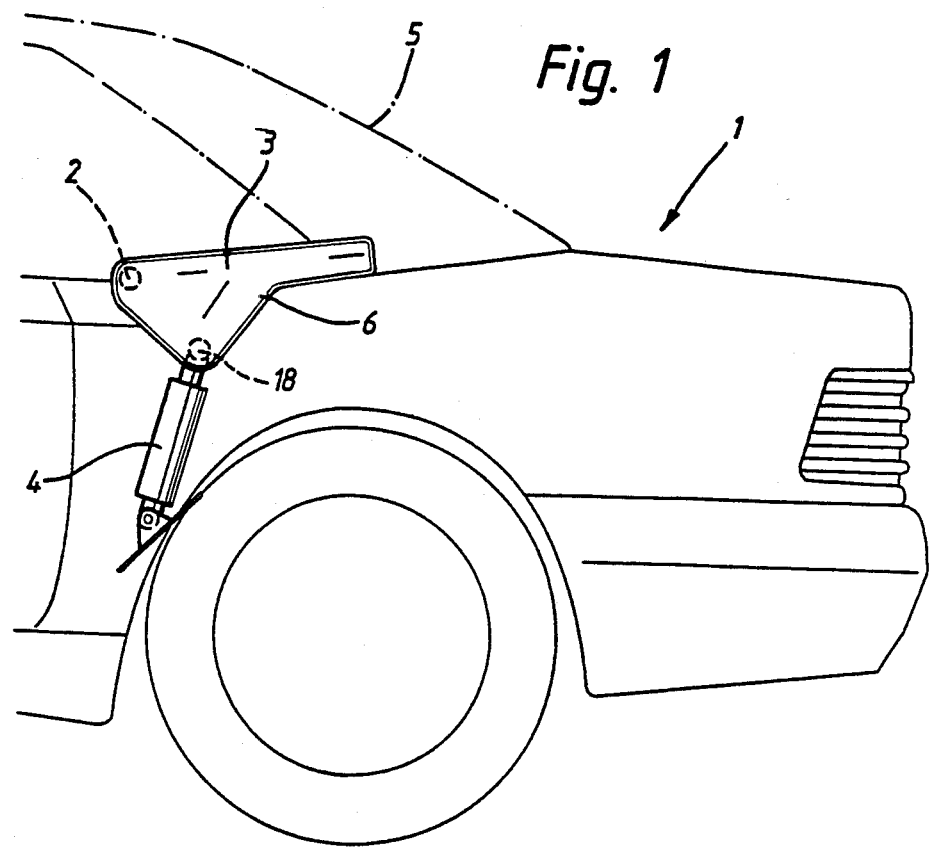
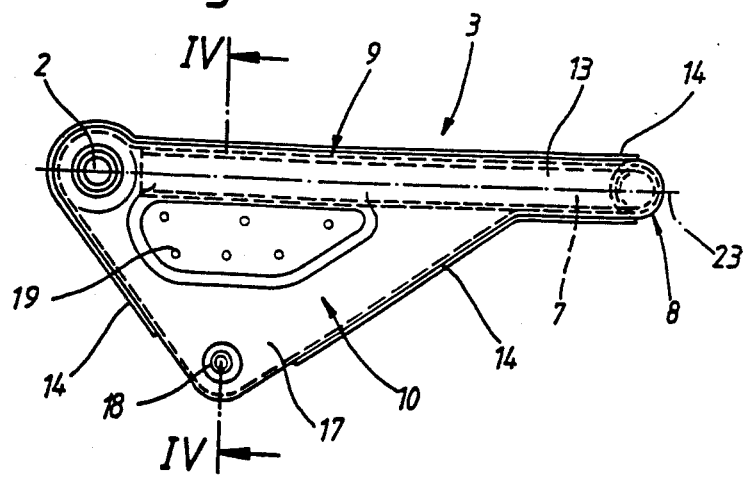

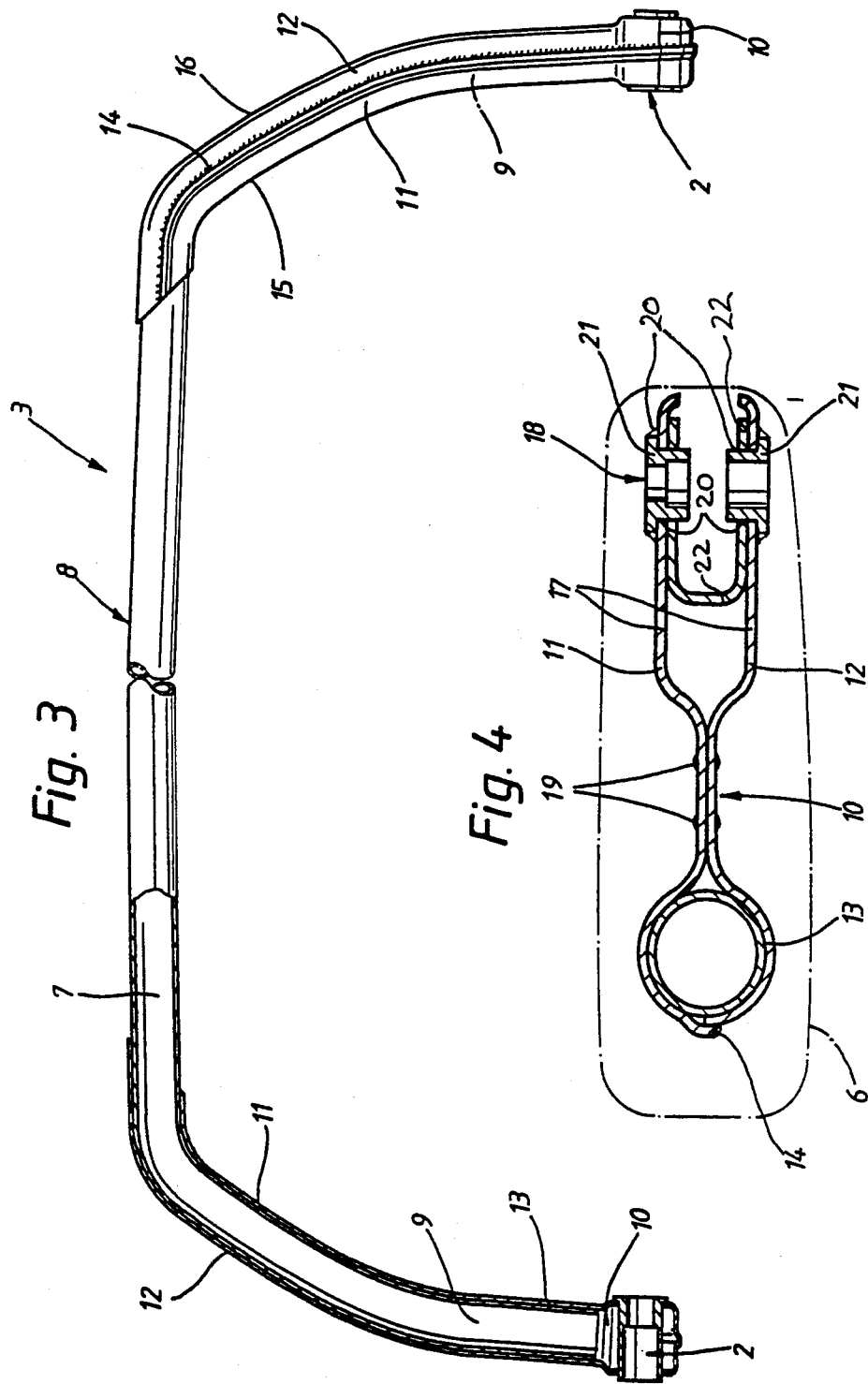

ROLL OVER BAR FOR MOTOR VEHICLES

BACKGROUND AND SUMMARY OF THE INVENTION

The invention relates to a roll-over yoke for a motor car.

A roll-over yoke is described in German Offenlegungsschrift No. 19 38 588 which is produced from high-alloy heat-treated steel, and which, due to the poor weldability dictated by the material, is gripped positively at each member by a bracing structure and is connectable by the latter to the vehicle.

In order to achieve this positive connection, it is necessary in this case for the members to be conically deformed by upsetting.

Bracing structures capable of use in the same sense are known from German Utiity Model 75 36 497 and from German Utility Model 75 04 021, which are formed from half-shells which require to be screwed to the support profile, whereby the load capacity of the latter is reduced.

An object of the invention is to construct a roll-over yoke with high strength and low weight and to mount the same on the motor car body.

The support tube can be produced with a small diameter and from high-tensile heat-treated material, the favorable material properties of which are aslo fully retained in the fastening, whereby high bracing reliability of the roll-over yoke when motor car overturns is achieved. Due to its positive connection to the half-shells, the support tube transmits the forces acting into the latter, which in turn transmit them into the motor car body.

The positive connection is particularly intimate. In preferred embodiments where the half-shells form a hollow profile having the cross-sectional dimensions of the support tube.

According to a certain preferred embodiments, the production of the half-shells from weldable material presents a plurality of advantages because the positive connection of the support tube to the half shells proceeds rapidly and may also be performed by automatic welding machines, and the resulting thermal stresses result in an additional frictional engagement between the parts to be connected, whereas a welding flange which is preferably oriented between the inner arc and the outer arc of the support tube occupies a favorable position against the weld seam breaking open under load.

According to the certain preferred embodiments, the half-shells likewise serve to increase the deformation strength of the support tube and to effect the mounting of the support tube advantageously on the motor car body.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic side elevation of the rear region of a motor car having a hingeable roll-over yoke, constructed in accordance with a preferred embodiment of the invention;

FIG. 2 is a schematic side view of the roll-over yoke of FIG. 1;

FIG. 3 schematically depicts the roll-over yoke of FIGS. 1 and 2 in the installation position viewed in the direction of travel; and FIG. 4 is a sectional view taken along the line IV—IV in FIG. 2.

DETAILED DESCRIPTION OF THE DRAWINGS

FIG. 1 illustrates the rear part of a motor car, in which a roll-over yoke 3 is mounted by a bearing element 2 on the motor car body 1. Roll-over yoke 3 is of hingeable construction and is extendable by a pivot drive 4 into an upper approximately vertical effective position in which it protects the vehicle occupants during overturning in the case of a yielding or also hinged-back roof sheathing 5.

The roll-over yoke 3 is provided with a cushioned covering 6, which reduces the danger of injury in the case of a collision.

As may be seen from FIGS. 2 and 3, the roll-over yoke 3 is formed by a support tube 7 whch exhibits a region 8 oriented at the top and at the center, approximately straight in the transverse direction of the vehicle in the effective position, and members 9 angled laterally therefrom.

This support tube 7, which consists of a high-tensile heat-trated material in order to increase safety and from consideration of weight, is received by each of its members 9 in a bracing structure 10 which mounts it on the motor car body 1. Bracing structure 10 consists of two half-shells 11 and 12, which enclose positively and thereby retain securely the respective member 9 and an adjacent part of the median region 8 of the support tube 7. The latter also simultaneously form a reinforcing means against buckling and bending of the respective member 9.

A common hollow profile 13, which is molded into the half-shells 11 and 12, exhibits the cross-sectional dimensions of the support tube 7 and is insertable into the latter, after which the half-shells 11 and 12 are welded together along an all-round welding flange 14.

This welding flange 14 is oriented between an inner arc 15 and an outer arc 16 of the arcuate support tube 7, whereby the bracing structure 10 is better protected against separation of the half-shells 11, 12 at the weld seam when the support tube 7 is under load.

For the mounting on the motor car body 1, the bearing element 2 is advantageously arranged centrally in the longitudinal axis 23 of the members 9, and the bearing 18 of the pivot drive 4 remotely therefrom with a favorable lever arm in a corner of the triangular bearing flange 17.

Referring to FIG. 4, the half-shells 11, 12 exhibit bearing bores 20 for bearing bushings 21 which are welded in place by means of stiffening plates 22.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Roll-over yoke for a motor car having an arcuate support profile mounted on the motor car body, which has a median region oriented at the top and at the center, approximately straight in the transverse direction of the vehicle in the effective position, and side members respectively angled laterally therefrom and oriented towards fastening points on the vehicle, wherein the support profile is comprised of a high-tensile heat-treated material and the side members are positively enclosed by a bracing structure which includes a bearing element serving for fastening to the vehicle, and wherein the bracing structure, which is comprised of two mutually connected half-shells, encloses in addition to the side members, at least a part of the median region which is adjacent to the side members, the support profile being constructed as a support tube.

2. Roll-over yoke according to claim 1, wherein the half-shells form a hollow profile having cross sectional dimensions corresponding to the support tube.

3. Roll-over yoke according to claim 1, wherein connected half-shells form a reinforcing means against buckling and bending of the members of the support tube.

4. Roll-over yoke according to claim 1, wherein the support tube conjointly with the bracing structure is articulated pivotably to the motor car body.

5. Roll-over yoke according to claim 1, wherein the half-shells form, in addition to the hollow profile, a bearing flange into which the bearing element and a bearing for a pivot drive are inserted.

6. Roll-over yoke according to claim 5, wherein the bearing flange adjoins the hollow profile triangularly, wherein the bearing element is located centrally in the longitudinal axis of the received member, and wherein the bearing of the pivot drive is arranged in the apex of the triangle farthest from the longitudinal axis.

7. Roll-over yoke according to claim 5, wherein the half-shells exhibit bearing bores into which bearing bushings are weldable and stabilizable by stiffening plates.

8. Roll-over yoke according to claim 1, wherein the half-shells wherein the half-shells are mutually connected by a spot weld in areally contracting sections.

9. Roll-over yoke according to claim 1, wherein the support tube and the half-shells are covered with a covering preferably made of plastic foam, acting as an impact element.

10. Roll-over yoke according to claim 1, wherein the half-shells are welded together around an all around welding flange.

11. Roll-over yoke according to claim 10, wherein the welding flange is disposed between an inner arc and an outer arc of the support tube.

12. Roll-over yoke according to claim 10, wherein the support tube is additionally frictionally anchorable by the thermal stresses resulting from the welding operation along the welding flange.

* * * * *